United States Patent Office 3,804,933
Patented Apr. 16, 1974

3,804,933
CHEMICAL EMBOSSING
John L. H. Allan, Easton, and Nathan D. Field, Allentown, Pa., assignors to GAF Corporation, New York, N.Y.
No Drawing. Continuation-in-part of abandoned application Ser. No. 833,187, June 13, 1969. This application Feb. 4, 1972, Ser. No. 223,744
Int. Cl. B29h 7/20
U.S. Cl. 264—52                                                 10 Claims

ABSTRACT OF THE DISCLOSURE

An improved process for the chemical embossing of a thermoplastic sheet comprising blending:
(1) A vinyl resin, e.g. polyvinyl chloride,
(2) A plasticizer for the vinyl resin,
(3) A blowing agent which decomposes when heated at a temperature in the range above the glass transition temperature of the plasticized vinyl resin and below the decomposition temperature of the resin,
(4) A monomer containing at least two olefinically unsaturated sites and capable of polymerization at elevated temperatures in the presence of an addition polymerization catalyst; and
(5) A monomer containing one olefinically unsaturated site and capable of polymerization at elevated temperatures in the presence of an addition polymerization catalyst.

Such a blended composition is formed into a sheet and to such sheet is applied, in a pre-determined pattern, a composition comprising
(a) A catalyst that will cause polymerization of the monomers and, optionally,
(b) A liquid that will penetrate the sheet.

The foaming of the sheet and creation of the embossed effect is accomplished by heating the resulting sheet to a temperature sufficient to fuse the plasticized resin, polymerize the monomer and decompose the blowing agent. The utilization of the monomer containing one olefinically unsaturated site allows for the production of an embossed effect through the utilization of less of the expensive monomer containing at least two olefinically unsaturated sites.

---

This application is a continuation-in-part of copending application Ser. No. 833,187, filed June 13, 1969, now abandoned.

The present invention is directed to a process of producing an embossed effect on a foam decorative material, e.g. a decorative surface covering; more particularly, the present invention is directed to a process of producing such embossed effect chemically without the use of mechanical embossing.

The mechanical embossing of foamed or cellular sheets, in combination with printing, has always presented several problems. It has been difficult to achieve sharp edges and sharp lines of demarcation in the embossed areas when dealing with foamed structures. Where printing is carried out in addition to the embossing, the problem of attaining register between the embossing rolls and the printing rolls has been exceedingly difficult. The difficulty increases with the width of the embossed and printed sheet. Therefore, there has been a need for an improved method of imparting an embossed appearance to the thermoplastic sheet.

To eliminate these deficiencies and disadvantages of conventional mechanical embossing of foamed or cellular sheets in combination with printing, various methods of chemical embossing have been developed. All of these methods generally involve the selective retardation or promotion of the foaming of a plastisol or organosol composition so that the resultant product will have both unfoamed and foamed regions.

Thus in accordance with the present invention, it has been discovered that the utilization of a mixture of two or more monomeric materials, at least one of which contains only one olefinically unsaturated grouping and at least one of which contains two olefinic groups, allows for the efficacious production of a chemical embossed effect on a foamed decorative surface covering in a manner not heretofore possible. Thus, in accordance with the present invention, it has been discovered that a satisfactory embossed effect can be produced in accordance with the process of the present invention in an economical and practical manner.

Accordingly, it is a principal object of the process of the present invention to provide for the production of chemically embossed foamed decorative sheets, particularly foamed decorative surface coverings, in a manner not contemplated by the prior art and eliminating the inherent disadvantages thereof.

It is a further object of the present invention to provide a process for the chemical embossing of thermoplastic sheets, by which a foamed decorative effect is produced through the conjoint employment of a monomer containing at least two olefinically unsaturated sites and a monomer containing one olefinically unsaturated site in a process which takes advantage of the in situ polymerization of such polymerizable monomers to produce the decorative effect upon the foamed thermoplastic sheet.

Still further objects and advantages of the novel process of the present invention will become more apparent from the following more detailed description thereof.

The above objects and advantages of the process of the present invention are achieved through an improvement associated with the chemical embossing of foamed decorative sheet materials and foamed decorative surface covering materials in particular. Thus, it has been found in accordance with the present invention that a great economic and industrial improvement can be achieved by conducting a process for the chemical embossing of foamed decorative sheet materials through the conjoint employment of a monomeric material having at least two olefinically unsaturated sites and a monomeric material having a single olefinically unsaturated site. Thus the process of the present invention comprises an improvement in the chemical embossing of thermoplastic sheet material, particularly, sheet material comprising polymers and copolymers of vinylchloride.

Thus, the process of the present invention comprises an improvement in a process of imparting an embossed appearance to a thermoplastic sheet of a vinylchloride resin containing a plasticizer for the vinyl resin, a blowing agent which decomposes when heated at a temperature in the range above the glass transition temperature of the plasticized vinyl resin and below the decomposition temperature of the resin, and a polymerizable monomer compatible with the plasticized vinyl resin. As noted above, the improvement of the present invention comprises the use of a monomer having a single olefinically unsaturated site, together with a monomer having two or more of such olefinically unsaturated sites. Such a mixture is formed into a sheet upon which is later applied a liquid that will penetrate the sheet and cause the polymerization of the monomeric system through the catalyst effect. Finally, the resulting sheet is heated to a temperature within the range of, for example, 300° to 450° F. to fuse the plasticized resin, decompose the blowing agent, and polymerize the monomeric system.

Generally, the process of the present invention directed to the production of embossed appearance on a thermoplastic sheet comprises blending, in the absence of an addition polymerization catalyst, (1) A vinyl resin,
(2) A plasticizer for the vinyl resin,
(3) A blowing agent which decomposes when heated at a temperature in the range above the glass transition temperature of the plasticizer vinyl resin and below the decomposition temperature of the resin,
(4) A monomer containing at least two olefinically unsaturated sites and capable of polymerizing at elevated temperatures in the presence of an addition polymerization catalyst,
(5) A monomer containing one olefinically unsaturated site and capable of polymerization at elevated temperatures in the presence of an addition catalyst.

Such a composition or blend is formed into a sheet, gelled, and applied to such sheet, in a predetermined pattern, is a composition comprising (a) A catalyst that will cause polymerization of the monomers, i.e. the diolefinically unsaturated and monoolefinically unsaturated monomer, and, optionally,
(b) Liquid that will penetrate the sheet.

Subsequently, the sheet to which has been applied in a predetermined pattern the above composition is heated to a temperature sufficient to fuse the plasticized resin, decompose the blowing agent, and polymerize the monomer. By such a process, the portion of the sheet to which has been applied the composition containing the catalyst and optionally penetrating liquid will remain substantially unfoamed due to the restricting character of the polymer produced by the polymerization of the unsaturated monomers, while the portion to which the catalyst has not been applied will be fully foamed. This, of course, will result in producing a patterned embossed effect containing high areas, fully foamed areas, and valleys, i.e. areas in which foaming has been chemically restricted.

Alternatively, in accordance with the process of the present invention, the catalysts and optional penetrating liquid may be applied to a supporting sheet with the vinyl resin blend being applied to the supporting sheet above the catalyst. Heating such a material to sufficient temperature to fuse the blend, decompose the blowing agent, and polymerize the unsaturated monomers will effect the same chemical embossing appearance of the vinyl sheet product having both completely foamed and unfoamed areas.

In accordance with the present invention, any conventional thermoplastic resin can be employed which is capable of being formed into films or sheets. Such resins preferably comprise vinyl resins; and more preferably, polymers and copolymers of vinylchloride. Thus, while polyvinylchloride itself is the preferred vinyl resin employed in accordance with the process of the present invention, copolymers of vinyl chloride with comonomers, for example vinyl esters such as vinyl acetate, vinylidene chloride, vinyl propionate, and vinyl butyrate, lower alkyl vinyl ethers such as methyl and isobutyl vinyl ether, and acrylic acid compounds such as acrylic acid, methacrylic acid, and the lower alkyl esters thereof, or a mixture of polyvinylchloride with at least one polymer derived from such comonomers may also be employed.

When unusually excellent properties of abrasion resistance, toughness, and tensile strength are not required, as many well be the case with a wall covering or other merely decorative application, other materials may be used as a thermoplastic resin. Examples of such materials will be polystyrene, substituted polystyrene, polyolefins such as polyethylene and polypropylene, and acrylic acid compounds such as acrylic acid, methacrylic acid and their lower alkyl esters and the like. The thermoplastic resins are those formed by addition polymerization as opposed to the normally nonthermoplastic resins usually formed by condensation. The glass transition temperature of these resins is the temperature at which the resin changes from a hard, brittle solid to a flexible solid. Increasing plasticization of the resin increasingly lowers the glass transition temperature. As a practical matter, the glass transition temperature of the resin lies close to the gellation temperature of the resin dispersed in a plasticizer even though the initial gellation temperature is rate sensitive.

In producing the thermoplastic resin blend utilized in accordance with the process of the present invention, the thermoplastic resin as described above will be combined with one or more conventional plasticizers. Esters of straight and branched chain alcohols with aliphatic acids impart low viscosity and good viscosity stability. Typical plasticizers of this type include dibutyl sebacate, dioctyl sebacate, dioctyl adipate, didecyl adipate, dioctyl azelate, triethylene glycol di(2-ethylhexanoate), diethylene glycol dipelargonate, triethylene glycol dicaprylate, 2,2,4-trimethyl-1,3-pentanediol diisobutyrate, and the like. Plasticizers of the aromatic type, such as esters of aliphatic alcohols and aromatic acids or aromatic alcohols and aliphatic acids or aromatic alcohols and aromatic acids are desirable in that they impart good foaming characteristics to a plastisol, although the use of highly aromatic plasticizers is limited by their tendency to yield plastisols of high viscosity. Typical plasticizers of this type include dibutyl phthalate, dicapryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate and the like. Other types of plasticizers, such as esters of inorganic acids, including tricresyl phosphate, octyl diphenyl phosphate and the like, alkyd derivatives of rosin, chlorinated paraffine, high molecular weight hydrocarbon condensates and the like can also be used. The plasticizer or blend of plasticizers is chosen to yield a composition of the desired viscosity and/or foaming characteristics. In addition, the plasticizer should preferably have a low vapor pressure at the temperatures required to fuse the resin. A vapor pressure of two millimeters of mercury or less at 400° F. has been found particularly satisfactory.

Generally, the plasticizer is blended with the thermoplastic resin in a range of from 20 to 130 parts by weight of the plasticizer per 100 parts by weight of the resin. Of course, greater or lesser amounts of the plasticizer can be employed, the amount of plasticizer generally being determined by the selection of the particular plasticizer, the particular resin, and the utility of the final product.

Minor amounts of stabilizers are usually incorporated in the coating compositions to reduce the effects of degradation by light and heat. Suitable light stabilizers include phenyl phthalate, phenyl benzoate, o-tolyl benzoate, o-nitrophenol, and organic phosphates and other complexes of such metals as barium, cadmium, calcium, zinc, strontium, lead, tin and the like. Suitable heat stabilizers include sulfides and sulfites of aluminum, silver, calcium, cadmium, magnesium, cerium, sodium, strontium, and the like, leucine, alanine, o- and p-amino benzoic acid and weak acid radicals including recinoleates and abietates, and the like. Normally, the compositions contain about 0.5 to about 5 parts stabilizer per 100 parts resin. The stabilizer in foamable compositions can exert influence on the decomposition of the blowing agent. Some stabilizers serve as catalyst causing the decomposition to take place at a lower temperature.

In accordance with the process of the present invention, a blowing agent is incorporated in the blend of the vinyl resin. The blowing agent, comprising another essential component of the resin blend, is one which decomposes when heated at a temperature within the range of above the glass transition temperature of the plasticized vinyl resin and below the decomposition temperature of the resin. Such blowing agent employed in accordance with the process of the present invention should be uniformly distributed throughout the resin-plasticizer blend. A number of blowing agents particularly applicable for the blowing or foaming of vinyl resins and polyvinylchloride in particular are commercially available, the most widely used of these being azo-bis formamide (azodicarbonamide). Such material normally decomposes at a temperature of about 390° F. in air. Because of this relatively high decomposition temperature, such a blowing agent is particularly adapted for use in the process of the present invention and thus is preferred. Other conventional blowing agents, however, can be suitably employed in accordance with the improved process of the present invention. Such conventional blowing agents and the temperature at which they release gas vigorously in dioctyl phthalate are represented in the following table:

| Blowing agent: | Temperature, ° F. |
|---|---|
| Azobisiobutyronitrile | 240 |
| N,N' - dimethyl - N,N' - dinitrosoterephthalamide | 220 |
| p,p'-Oxybis(benzenesulfonylhydrazide) | 320 |
| p,p'-Oxybis(benzenesulfonylsemicarbazide) | 425 |
| Barium azodicarboxylate | 480 |
| Dinitrosopentamethylenetetramine (80%) | 370 |

Thus, as noted from the above, the conventional blowing agents useful in the blowing or foaming of vinyl resins and polyvinylchloride in particular generally fall within the general class of substituted hydrazides, substituted azo compounds, and substituted nitroso compounds. In this regard, any of the conventionally employed blowing agents useful in the foaming of vinyl resins can be employed in accordance with the process of the present invention, the above noted particular foaming agents only being representative of those which are useful. Thus, it is only necessary that the blowing agent employed in accordance with the process of the present invention be one which decomposes when heated at a temperature in the range of above the glass transition temperature of the plasticized vinyl resin and below the decomposition temperature of the vinyl resin.

As a general rule, the preferred minimum decomposition temperature of the blowing agent should be about 300° F., the decomposition temperature of polyvinylchloride being, for example, about 400° F. Accordingly, the blowing agent should be one which decomposes within such temperature range, or, more practically, within the temperature range of 300° F. to 450° F., the temperature at which a stabilized vinyl resin composition will normally decompose.

While the amount of blowing agent employed in accordance with the process of the present invention is not critical and the same need only be employed in an amount so that effective foaming can be achieved when the blowing agent is thoroughly distributed throughout the resin-plasticizer mixture, the blowing agent will normally be present in an amount within the range of 0.5% to 15% by weight, based on the weight of the thermoplastic resin. Of course, slightly higher or lower amounts of blowing agent can be advantageously utilized where desired for particular purposes.

It is common practice to add accelerators or catalysts to the compositions to accelerate the decomposition of the blowing agents, reduce the decomposition temperature and/or narrow the decomposition temperature range. Typical types of accelerators are various metal salts such as dibasic lead phosphite, dibasic lead stearate, dibasic lead phthalate and similar lead salts, zinc salts such as zinc laurate, zinc oxide, zinc stearate, zinc carbonate, zinc salt of mercapobenzothiazole, zinc octoate, zinc naphtholate, zinc dust, and cadimum octoate. These agents can also serve as stabilizers for the composition. Accelerators can be very effective for broadening the decomposition temperature differential between the inhibited blowing agent and the remaining blowing agent. In this specification and claims, the designation "blowing agent" is intended to include not only blowing agent itself, but also the combination of a blowing agent with an accelerator.

As indicated previously, in accordance with the improved process of the present invention, the vinyl resin-plasticizer blend has incorporated therewith a monomeric system comprising a monomer having at least two olefinically unsaturated sites and a monomer containing a single olefinically unsaturated site. Such a monomeric system not only polymerizes under the conditions to be described hereinafter, but also tends to cause cross-linkages of the polyvinyl resin chains. This polymerization and cross-linking effect is what allows for the retardation of the foaming of the vinyl resin sheet in those areas in which the sheet has been coated with the polymerization catalyst. Aside from the unsaturated characteristics of the monomers employed in accordance with the improved process of the present invention, the monomers employed must be compatible with the plasticized vinyl resin (miscible therewith and capable of being intimately dispersed within the vinyl resin system) and must be polymerizable in the presence of an addition polymerization catalyst at a temperature above the glass transition temperature and below the decomposition temperature of the plasticized vinyl resin system.

Examples of suitable polymerizable monomers containing at least two olefinically unsaturated sites include the di- and tri-acrylates and methacrylates prepared by the esterification of glycols and triols with acrylic acid and methacrylic acid such as diacrylates and dimethacrylates of ethylene glycol, 1,2-, 1,3- and 1,4-butanediols, hexanediols, and tetraethylene glycol, trimethylol propane trimethacrylate and triacrylate, and the like. Monoacrylates and methacrylates are usable where the esterifying alcohol itself contains an olefinically unsaturated bond, as is the case in allyl acrylates and methacrylates. Dicarboxylic acids may be esterified with unsaturated alcohol to produce such usable monomers as diallyl fumarate and succinate. Diolefinically unsaturated hydrocarbons such as divinyl benzenes, divinyl toluene, and other divinyl substituted benzenes and the like also function to polymerize and to cross-link in the present process.

In this connection, it is one of the advantages of the process of the present invention that a fairly small amount of the expensive di- or polyethylenically unsaturated monomers can be employed while obtaining equivalent or better chemical embossed effects through the use of a second monomer containing only a single olefinically unsaturated site. Further, since the di- and polyolefinic monomers have a relatively greater tendency to prepolymerize prior to the blowing step and/or application of the polymerization catalyst, thereby pro tanto reducing the capacity to foam throughout the vinyl resin sheet, the present invention involving a reduction in the proportions of such monomers enables the attainment of further improved differential embossed effects.

The monomer containing only a single olefinically unsaturated site may be practically any of the conventional monomer materials well known in the art. Exemplary groups of such conventional monomers include, for example, the vinyl aromatic compounds, vinyl esters, acrylic and methacrylic acids, and derivatives, i.e. esters, thereof.

Accordingly, such monomers containing only one olefinically unsaturated grouping which can be employed in accordance with the improved process of the present invention include, for example, styrene, alkyl and aryl substituted styrene, e.g. para-ethyl styrene, para-phenyl styrene, etc.; vinyl esters such as vinyl acetate, vinyl proprionate, vinyl butyrate, etc.; and alkyl acrylates and methacrylates such as acrylate, t-butyl acrylate, isobutyl acrylate, 2-ethylhexyl acrylate, cyclohexyl acrylate, lauryl acrylate, stearyl acrylate, 2-methoxyethyl acrylate, methyl-α-chloroacrylate, methyl-α-cyanoacrylate, propyl thioacrylate; methyl methacrylate, n-butyl methacrylate, sec-butyl-methacrylate, isobutyl methacrylate, isodecyl methacrylate, lauryl methacrylate, stearyl methacrylate, 2-hydroxyethyl methacrylate, 2-hydroxypropyl methacrylate, glycidyl methacrylate, etc.

Other suitable monoethylenically unsaturated monomers which can be employed in accordance with the process of the present invention include, for example, such conventional monomers as alkyl vinyl ethers, e.g. methyl and isobutyl vinyl ether, etc.

While a single monoethenically unsaturated monomer can of course be employed in accordance with the process of the present invention, mixtures of such monoethenically unsaturated monomers can be advantageously employed where desired. Thus, for example, suitable mixtures can comprise styrene and methyl methacrylate, maleic anhydride and isobutyl vinyl ether, etc.

In general, the total amount of both types of monomers should be about 16 to 26% by weight of the vinyl resin in the foamable layer, and about 0.8 to 7 parts of the monoolefinic monomer should be employed per part by weight of the di- or polyolefinic monomer.

To these essential ingredients, the resin, the plasticizer, the blowing agent, and the polymerizable monomers, there may be added additional ingredients such as pigments, dyes, or other decorative elements to the composition to be formed into one sheet. Depending on the material used and the intensity of the color desired, the amounts of such extra additives will normally range from a small fraction of a percent to 20% by weight of the total composition. Relatively small amounts of a granular filler such as a clay, a limestone, or a silicate may be used. However, the composition will not be highly filled in view of a need for at least a portion of the composition to expand and form a cellular or foamed region. Fillers to be used, if any, will normally be present in less than about 20% by weight of the total composition. Small amounts of heat and light stabilizers as described above will also be incorporated in addition to the barium-cadmium salts of long-chain fatty acids, polyols such as pentaerythritol and α - methylglucoside, nitrogen compounds such as melamine and dicyandiamide, esters such as triethylene glycol salicylate, and mixtures thereof.

As indicated previously, in accordance with the process of the present invention, the above-defined components are blended and then formed into a sheet by any conventional method known in the art. Thus, for example, the plastisol composition may be doctored, roll coated, or otherwise applied to a strippable carrier sheet. Of course, such process of forming a thermoplastic sheet from the vinyl resin plastisol composition is the same as utilized in prior art processes involving similar chemical embossing techniques. The thermoplastic sheet produced in accordance with the process of the present invention will generally have a thickness within the range of about 0.01 to about 0.2 inch exclusive of any backing material. This thermoplastic sheet is gelled to facilitate printing thereon, and to the gelled sheet is applied a printing ink in a predetermined pattern, the printing ink containing a catalyst effecting the polymerization of the monomer system at the temperature at which the blowing or foaming agent incorporated in the thermoplastic sheet is decomposed. Accordingly, subsequent application of heat to decompose the blowing agent will also effect the polymerization of the monomer system in those portions of the thermoplastic sheet to which the printing ink containing the catalysts has been applied. Optionally, the printing ink containing the catalyst effective to polymerize the monomer system will contain a liquid that will penetrate the thermoplastic sheet. This, of course, allows better contact of the catalyst and the polymerizable monomers.

The catalyst employed in accordance with the process of the present invention can be any of the known free radical catalysts conventionally used to enhance the polymerization of both mono-olefinically and polyolefinically unsaturated monomers. They comprise primarily the organic per-compounds. Among the peroxides that are usable are di-t-butyl peroxide, benzoyl peroxide, lauroyl peroxide, capryloyl peroxide, acetyl peroxide, p-chlorobenzoyl peroxide, cumene hydroperoxide, and the other known peroxide initiators. Large numbers of such peroxides exist, and generally they are broken down into broader groups comprising low-temperature types, intermediate-temperature types, and high-temperature types. The high-temperature types are those generally used above 212° F. Other per-compounds such as t-butyl perbenzoate, and isopropylpercarbonate are usable in the present process. Besides the per-compound type of free-radical initiators, there may be used such aliphatic azocatalysts as alpha, alpha'-azodiisobutyronitrile.

As indicated previously, the ink composition which is applied in a pattern over selected areas of the thermoplastic sheet preferably contains a liquid capable of penetrating the thermoplastic sheet so as to carry the polymerization catalyst into the thermoplastic sheet to more effectively promote the polymerization of the monomeric system. Such a penetrating liquid generally comprises a carrier liquid, which is preferably a diluent, solvent, or plasticizer for the particular vinyl resin of the thermoplastic sheet. Thus, for example, a mixture of methylethyl ketone and dioxane serves as a particularly suitable carrier for many of the polymerization catalysts. The carrier liquid or penetrating liquid that is chosen should be one which the polymerization catalyst is soluble in or at least partly soluble, so that upon penetration of the liquid into the thermoplastic sheet the catalyst will be carried into the sheet for best contact of the catalyst with the polymerizable monomer. Where the catalyst is soluble in plasticizers such as tributoxyethyl phosphate, then such plasticizers may serve as carriers for the catalyst.

As indicated previously, the chemical embossed effect is obtained by distributing the catalyst, preferably in the penetrating liquid, over predetermined areas of the thermoplastic sheet, so that by subsequent application of heat the preferential polymerization of the monomeric system in those areas over which the catalyst composition or printing ink has been applied will produce areas which are foamed to a lesser extent than those areas over which the catalyst composition was not applied.

Application of the carrier liquid containing the catalyst may be carried out in any convenient manner. The liquid may in fact be used as a printing ink and may also contain dyes, pigments, filler, wetting agent, stabilizer, and other compounds normally found in ink. Such a colored ink, when printed on an above-described thermoplastic sheet by any of the known printing methods, will produce a colored design or pattern printed on the sheet. Subsequent application of heat as described earlier will then produce foaming in only those areas which have not been contacted with this ink.

As indicated previously, as an alternative to applying a catalyst and optional penetrating liquid directly to the top surface of the thermoplastic sheet, the composition containing the catalyst and optional penetrating liquid may be applied to a supporting sheet with the blend of thermoplastic polymer being applied to the supporting sheet above the catalyst composition. Subsequent application of heat sufficient to fuse the blend, decompose the blowing agent, and polymerize the monomer system will also produce the chemical embossed effect in this manner.

When the catalyst composition and optional penetrating liquid are applied to the thermoplastic sheet or supporting sheet the thickness of the application will generally range from about 0.1 mil to about 20 mils depending somewhat on the ability of the carrier liquid to penetrate the thermoplastic sheet and on the concentration of the catalyst in the liquid carrier. Depending on the activity of the particular catalyst selected, the concentration of the catalyst in the ink will generally comprise about 3% to about 25% by weight of the total weight of the ink composition.

Once the composition containing the catalyst has been applied in a decorative pattern on the surface of the thermoplastic sheet, the sheet may, if desired to permit storage or other interim handling, be dried without causing foaming by the application of a gentle heat.

A clear or colored coating of a thermoplastic resin may be then sprayed, doctored, or roll applied over the entire sheet in known manner. This final coating may contain a flatting agent to control gloss. Such coating may consist of a plastisol or organosol, will have little pigment or filler therein, and may otherwise resemble the foamable layer without blowing agent and olefinic monomers. This clear coat will be the final coat and will overlay any printing which has previously been applied to the thermoplastic sheet. On the application of heat to cause fusion of the resin, decomposition of the blowing agent, and polymerization of the monomers, the clear coat will also fuse and become an integral part of the system covering both the raised foam areas and the low unfoamed areas on the sheet. A protective wear layer is thereby provided which is especially desirable for floor coverings and the like.

It will of course be understood that the above-described wear layer may alternatively be provided by laminating in known manner a clear, prefused vinyl sheet to the catalyst-containing pattern layer prior or subsequent to the above-described blowing and polymerizing heat treatment.

It will also be understood that in accordance with the present invention, the formed sheet carrying the catalyst-containing layer, and wear layer if desired, may often with advantage be heated at a temperature below the decomposition temperature of the blowing agent for a period of time to initiate and complete the cross-linking and polymerization reaction prior to the blowing step, provided suitable monomers are employed which polymerize under such conditions. Such alternative treatment, however, is generally not necessary when the catalyst is applied to the backing support before the foamable blend is applied, the heat treatment given during the preliminary fusing of the foamable blend generally being sufficient.

The improved process of the present invention will now be described by reference to the following specific examples which are only illustrative. All parts and proportions referred to herein and in the appended claims are by weight unless otherwise indicated.

EXAMPLE 1

Plastisol was prepared by mixing the following ingredients:

| | Parts by weight |
|---|---|
| Poly(vinyl chloride) | 180 |
| Metallic soap stabilizer (zinc-cadmium octoate) | 5.5 |
| Titanium dioxide (1:1 in dioctylphthalate) | 20 |
| Azodicarbonamide (1:1 in epoxidized soya oil) | 9 |
| Hydrocarbon diluent (mineral spirits, Solvesso 150) | 7.5 | together with the following amounts of plasticizer and monomers:

| Sample number | 1 | 2 | 3 | 4 |
|---|---|---|---|---|
| Dioctyl phthalate | 80 | 64 | 64 | 56 |
| Trimethylol propane trimethacrylate | 20 | 20 | 20 | 20 |
| t-Butyl acrylate | | | 16 | |
| 2-ethylhexylacrylate | | | 16 | 24 |

Pigmented solutions of the catalyst were prepared from the following pigmented binder solution:

| | Parts |
|---|---|
| Pigment (2.5 parts Heliogen Blue A in 1 part epoxidized soya oil) | 85 |
| Calcium carbonate | 25 |
| Vinyl chloride/vinyl acetate binder results | 125 |
| Dioctyl phthalate | 8 |
| Dispersing agent (polyethylene glycol monolaurate) | 2.4 |
| Aromatic hydrocarbon (toluene) | 133 |
| Ketone solvents (methyl ethyl and methyl isobutyl ketone, 1:1) | 477 |

The above pigment/binder blends were mixed with the following peroxide in the parts given.

| | Parts by weight | |
|---|---|---|
| | Peroxide | Pigment/binder |
| (i) Dicumyl peroxide | 20 | 80 |
| (ii) 2,5-dimethyl-2,5-di(t-butylperoxy)hexane | 20 | 80 |
| (iii) n-Butyl-4,4-bis(t-butylperoxy) valerate | 20 | 80 |
| (iv) Di-t-butyl diperphthalate (50% in DOP) | 30 | 70 |
| (v) t-Butyl peracetate (75% in benzene) | 20 | 80 |
| (vi) t-Butyl peroxyisobutyrate (75% in benzene) | 20 | 80 |
| (vii) t-Butyl perbenzoate | 20 | 80 |
| (viii) t-Butyl peroctoate | 10 | 90 |
| (ix) Benzoyl peroxide | 10 | 90 |
| (x) Lauroyl peroxide | 15 | 85 |

The plastisol blends 1–4 were applied at a wet thickness of about 0.02 inch to a cardboard sheet and gelled in an oven for 5 min. at 120° C.

The pigmented binder/peroxide solutions (i) to (x) were then printed onto the films 1–4 by rotogravure, and the printed sheets then fused and expanded in an oven held at 180° C. for 3.5 minutes.

Each of the sheets so produced have an embossed effect; that is, an effect wherein that portion over which the catalyst solutions were printed were foamed to a lesser extent than the other portions of the sheet, the embossed effect being more pronounced with respect to Sheets 2 to 4. These were the sheets which, in accordance with the present invention, contained both the polyolefinically unsaturated monomer and monoolefinically unsaturated monomer.

EXAMPLE 2

Example 1 is repeated except that the plastisol composition was mixed with the following amounts of plasticizers and monomers:

| Sample number | 5 | 6 | 7 | 8 | 9 |
|---|---|---|---|---|---|
| Dioctyl phthalate | 80 | 80 | 70 | 70 | 70 |
| Tetraethylene glycol dimethacrylate | 20 | 10 | 30 | 10 | 10 |
| Vinyl butyrate | | 20 | | | |
| Para-ethyl styrene | | | | 20 | 10 |
| n-Octyl vinyl ether | | | | | 10 |

Employing the procedure of Example 1, Sheets Nos. 5 through 9 were produced, each having an embossed effect. A visual examination of the sheets indicated that the embossed effect in each was to a similar extent, even though Sheets 6, 8, and 9 employed less of the polyolefinically unsaturated monomer previously employed to effect a cross-linking.

EXAMPLE 3

Plastisols were prepared from the following ingredients:

| | Parts by weight |
|---|---|
| Poly(vinyl chloride) | 50.6 |
| Dibutyl phthalate | 17.3 |
| Metallic soap stabilizer (zinc cadmium octoate) | 1.3 |
| Titanium dioxide | 12.6 |
| Azodicarbonamide | 1.3 |
| Epoxidized soybean oil | 3.1 |
| Hydrocarbon diluent (Solvesso 150) | 1.3 | together with the following amounts, expressed as parts by weight, of plasticizer and monomers.

| Sample | 10 | 11 | 12 | 13 | 14 |
|---|---|---|---|---|---|
| Plasticizer | 1.0 | 0.0 | 2.5 | 5.0 | 2.5 |
| Trimethylolpropane trimethylacrylate | 1.5 | 2.5 | 2.5 | 2.5 | 5.0 |
| 2-ethylhexyl acrylate | 10.0 | 10.0 | 7.5 | 5.0 | 0.0 |

Plastisols 10 through 14 were each applied at a wet thickness of about 0.01 inch to cardboard backings and gelled in an oven for 5 minutes at 120° C.

The pigmented binder/peroxide solutions (i) through (x) were then printed on the films derived from plastisols 10 through 14 by rotogravure, and the printed sheets were then fused and expanded in an oven held at 180° C. for 3.5 minutes.

Each sheet had an embossed effect. With each of the inks, the degree of embossing increased in the following order, where the numbers refer to the number of the plastisol used in making the film: 10, 13, 14, 12, 11.

We claim:
1. A process for providing an embossed appearance to a thermoplastic sheet which comprises forming into a sheet a blend devoid of polymerization catalyst and consisting essentially of:
   (1) a vinyl resin;
   (2) a plasticizer for said vinyl resin in an amount of from 20 to 130 percent by weight based on the weight of the resin;
   (3) a blowing agent which decomposes when heated at a temperature within the range of above the glass transition temperature of the plasticized resin and below the decomposition temperature of said resin, said blowing agent being present in an amount of from 0.5% to 15% by weight based on the weight of the resin;
   (4) a monomer having at least two olefinically unsaturated sites and polymerizable in said temperature range in the presence of an addition polymerization catalyst; and
   (5) about 0.8 to 7 parts, per part by weight of monomer (4), of at least one monomer containing only one olefinically unsaturated site and polymerizable in said temperature range in the presence of an addition polymerization catalyst; applying to said sheet, in a predetermined pattern, an addition polymerization catalyst composition which will cause polymerization of said monomers in said temperature range, and subsequently heating the resultant sheet within said temperature range to fuse the plasticized resin, decompose the blowing agent and polymerize the monomers, said monomers being employed in said blend in a total amount of about 16 to 26% by weight of said resin.

2. The process of claim 1 wherein said vinyl resin is polyvinylchloride.
3. The process of claim 1 wherein said catalyst is a peroxide catalyst.
4. The process of claim 1 wherein said catalyst composition contains a liquid capable of penetrating said thermoplastic sheet.
5. The process of claim 4 wherein said liquid capable of penetrating said thermoplastic sheet is a plasticizer therefor.
6. The process of claim 4 wherein said liquid capable of penetrating said thermoplastic sheet is a solvent therefor.
7. The process of claim 1 wherein said catalyst composition contains a coloring material.
8. The process of claim 1 wherein said vinyl resin is polyvinylchloride, a copolymer of vinyl chloride with a member of the group consisting of vinyl esters, lower alkyl vinyl ethers, acrylic acid, methacrylic acid, and lower alkyl esters of such acids, or a mixture of polyvinylchloride with at least one polymer derived from said members.
9. The process of claim 1 wherein said monomer (4) is selected from the group consisting of acrylic or methacrylic acid esters of glycols, triols, or olefinically unsaturated alcohols, diesters of dicarboxylic acids with unsaturated alcohols, and divinyl-substituted benzenes.
10. The process of claim 1 wherein said monomer (5) is selected from the group consisting of styrenes, vinyl esters, alkyl vinyl ethers, alkyl acrylates, and alkyl methacrylates.

References Cited

UNITED STATES PATENTS

| 3,365,353 | 1/1968 | Witman | 161—116 |
| 2,746,940 | 5/1956 | Cooper et al. | 260—2.5 P |

DONALD E. CZAJA, Primary Examiner

M. I. MARQUIS, Assistant Examiner

U.S. Cl. X.R.

260—2.5 P; 264—47, 54, Dig. 82